Figure 1:
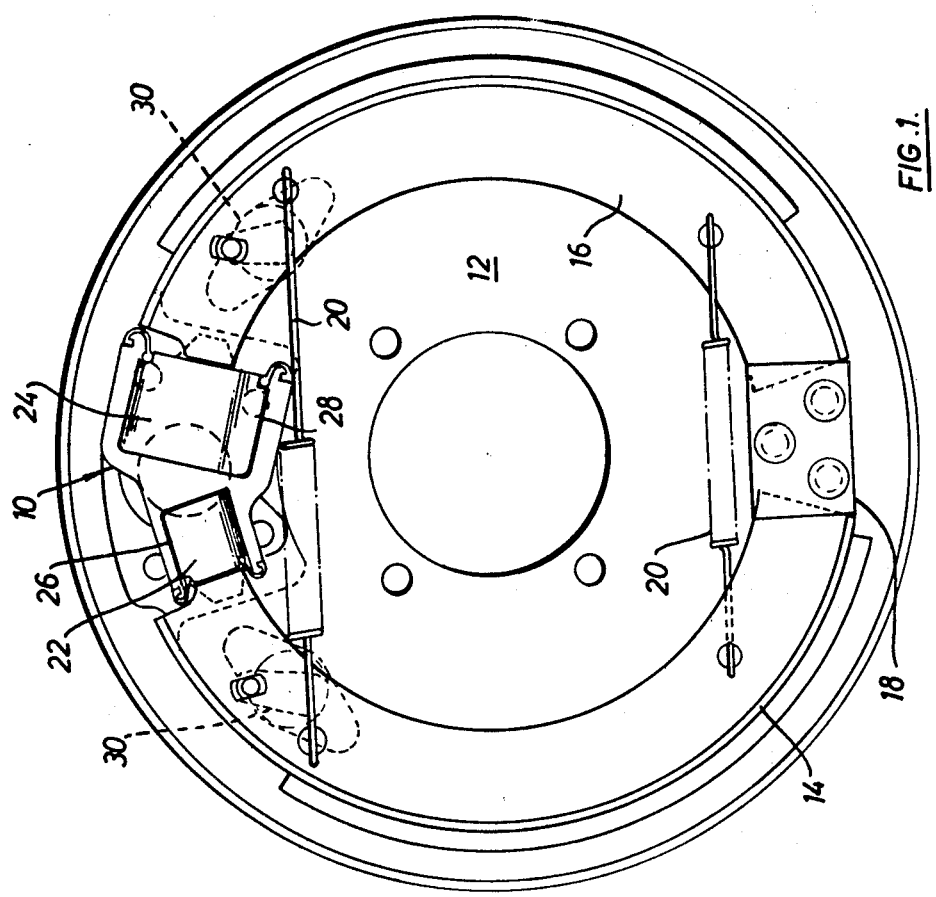

United States Patent

[11] 3,610,378

[72] Inventor Arthur Goddard
 Solihull, England
[21] Appl. No. 820,383
[22] Filed Apr. 30, 1969
[45] Patented Oct. 5, 1971
[73] Assignee Girling Limited
 Birmingham, England
[32] Priority May 11, 1968
[33] Great Britain
[31] 22,448/68

[54] PLURAL VEHICLE BRAKE SYSTEM
 2 Claims, 2 Drawing Figs.
[52] U.S. Cl. .......................................... 188/345,
 188/327
[51] Int. Cl. ......................................... B60t 11/20
[50] Field of Search ............................ 188/152.02,
 152.81, 152.82, 327, 345, 78

[56] References Cited
 UNITED STATES PATENTS
1,630,178 5/1927 Harrington .................. 188/152 (.02)
1,943,886 1/1934 Carroll ....................... 188/152 (.82) X FOREIGN PATENTS
877,742 9/1942 France ......................... 188/152 (.02)
1,146,888 5/1957 France ......................... 188/152 (.02)

Primary Examiner—George E. A. Halvosa
Attorney—Scrivener, Parker, Scrivener and Clarke ABSTRACT: There is disclosed a shoe drum brake and a braking system utilizing such a brake. The brake has a pair of brake shoes, with a hydraulic expander unit arranged between one pair of adjacent ends of said shoes and a fixed anchorage arranged between the other pair of adjacent ends. The expander unit has two oppositely directed shoe displacing pistons having different cross-sectional areas, which are slidably arranged in corresponding cylinders in the unit so as to assist in positioning the center of pressure of the lining, within the region of the center of area of each shoes' lining. A shoe drum brake as disclosed, is attached to each wheel of the vehicle, and the leading shoes at the front wheels of the vehicle together with the trailing shoes at the rear wheels are interconnected, and actuable by means for directing pressure fluid from a source of such fluid. The remaining brake shoes are likewise interconnected and arranged for simultaneous actuation with said first mentioned shoes.

PLURAL VEHICLE BRAKE SYSTEM

The present invention concerns vehicle hydraulic brakes and relates more particularly to shoe drum brakes of the type including at least one leading and one trailing shoe.

Modern vehicle practice increasingly requires a vehicle to be provided with a braking system having a dual operating facility, so that, should one part or aspect of the system fail in use, the remaining part of the system is still available to operate some or all of the brakes.

According to the present invention, a vehicle braking system comprises for each vehicle wheel, a shoe drum brake including at least one leading shoe and trailing shoe combination, a source of pressure fluid, means for directing fluid pressure from said source to actuate the leading shoes at the vehicle front wheels together with the trailing shoes at the rear wheels and independent means for directing fluid pressure simultaneously to actuate the remaining shoes.

By virtue of the braking system provided by the invention, regardless of the direction of motion of the vehicle, when one part of the system has failed, the vehicle retardation is improved by the fact that one set of wheel brakes i.e. either those at the front or those at the rear always has its leading shoe applied. This is especially useful in a drum brake where no attempt has been made to obtain equal performance from both the leading shoes and the trailing shoes, for example by arranging for the pressure fluid to apply differential actuating forces to the different shoes.

The braking system proposed by the invention is in fact most conveniently used together with shoe drum brakes in which the shoes are subjected to differential operating forces and according to another feature of the present invention, there is provided a shoe drum brake comprising a pair of arcuate brake shoes each respectively having a shoe lining, with a hydraulically actuated expander unit arranged between one pair of adjacent ends of said shoes and a fixed anchorage or abutment arranged between the other pair of adjacent ends and in which the expander unit includes oppositely directed shoe displacing pistons having different cross-sectional areas, each piston being received in a cylinder of said unit which is inclined to assist in positioning the center of pressure of the lining within the region of the center of the area of the shoe lining. Conveniently, in a brake of this character, the pistons may be arranged for hydraulic actuation independently of one another.

According to yet another aspect of the invention, a vehicle brake as defined in the preceding paragraph hereof may be modified by arranging the pistons to be axially aligned with one another rather than in the inclined attitude described.

Figure 2:
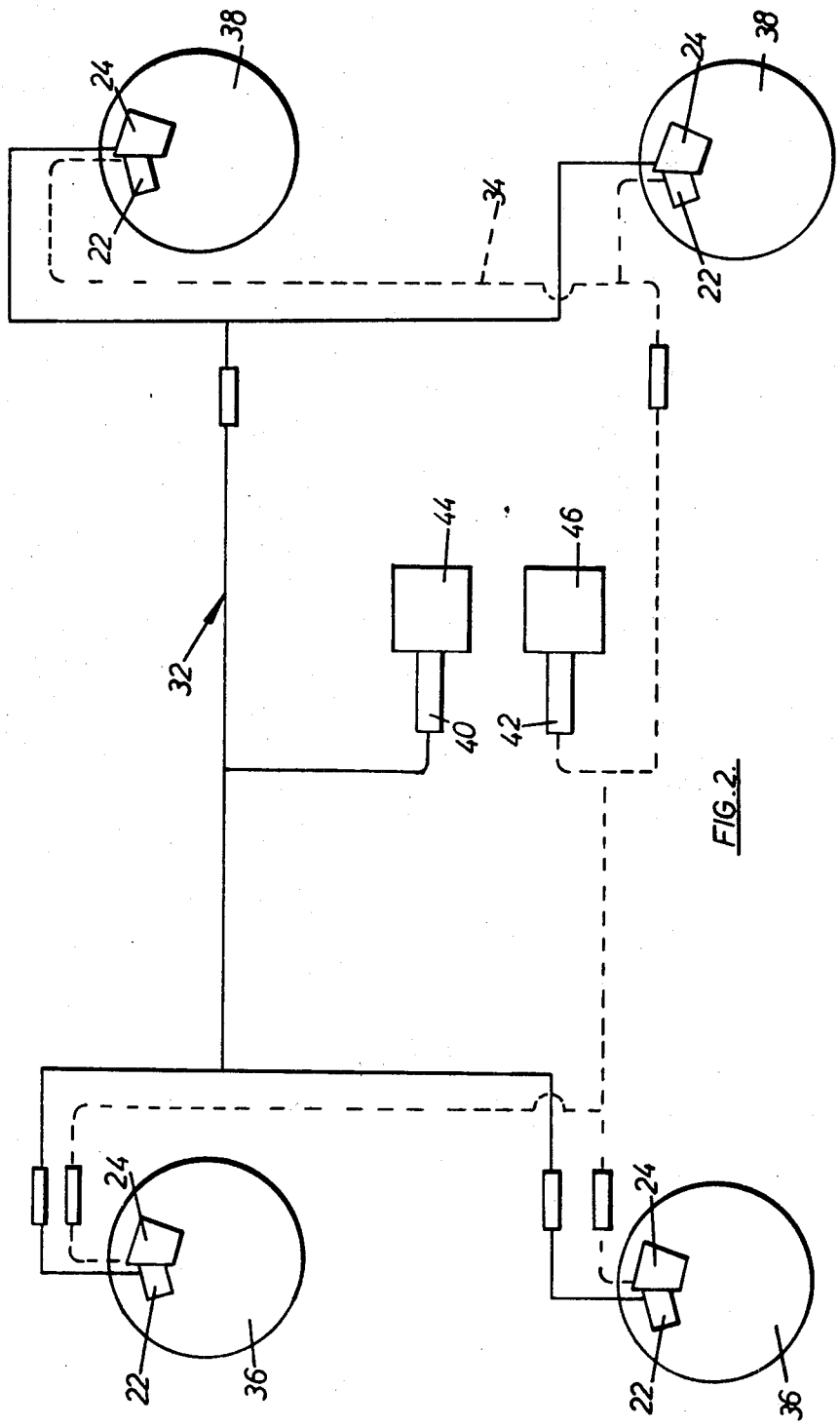

The present invention will now be further described, by way of example, with reference to the accompanying drawings in which:

FIG. 1 is a radial section of a shoe drum brake, and
FIG. 2 is a diagrammatic illustration of a brake actuating hydraulic system embodying the invention.

In the brake shown in FIG. 1, a hydraulic actuator or expander unit generally designated 10 is secured to a brake backplate 12 between one pair of adjacent ends of a pair of arcuate brake shoes 14 and 16 displaceable on the backplate, the other ends of the brake shoes being located on a fixed anchorage or abutment 18 also secured to the backplate. Shoe return springs 20 normally retain a running clearance between the shoes and the brake drum (not shown). In FIG. 1, the direction of drum rotation for forward motion is anticlockwise, so that the left hand brake shoe 14 acts as a leading shoe and receives servo assistance from the rotation of the drum.

In order to obtain equal work from each shoe and therefore equal life of the two linings, the leading shoe 14 is operated with less force from the expander unit 10 than the trailing shoe 16. For this purpose, the expander unit includes a leading shoe actuating piston 22 which is of less cross-sectional area than the trailing shoe actuating piston 24. The hydraulic cylinders 26 and 28 respectively containing the pistons are provided with individual hydraulic connections (not shown) to separate hydraulic pressure generating sources which may either be static hydraulic systems controlled by directly or indirectly master cylinder means or which may alternatively be full flow hydraulic systems including a pump, a reservoir, a hydraulic accumulator if required and fluid flow control valve means preset to deliver selected piston operating pressures to the cylinders. It will be noted that the cylinders 26 and 28 are inclined to assist in positioning the center of pressure within the region of the center of area of the shoe linings.

Automatic adjusting means of any convenient type and generally designated by the reference numeral 30 in FIG. 1 is provided for each of the brake shoes 14 and 16 adjacent their actuated ends to maintain a substantially constant running clearance between the shoes and the drum irrespective of condition of wear of the shoe lining. In this way, the quantity of fluid delivered to the cylinders during brake actuation is minimized.

The brake illustrated in FIG. 1 is conveniently employed in the hydraulic braking system shown in FIG. 2. FIG. 2 shows a so-called horizontally split hydraulic system whereby, irrespective of which of the two hydraulic lines should fail, the other line is still capable of applying braking effort to all four vehicle wheels. In the illustrated system the brake actuating pistons 22 and 24 will be observed to be connected in two completely independent hydraulic circuits respectively designated 32 and 34, the circuit 32 being shown in full lines and the circuit 34 in dash lines. The hydraulic circuit 32 is connected to the two pistons 22 associated with the leading brake shoes at the two front wheels 36 of the vehicle and to the two pistons 24 of the trailing shoes at the rear wheels 38 of the vehicle. The independent hydraulic system 34 is connected in a complementary manner to the two pistons 24 of the trailing shoes of the front wheels 36 and to the two pistons 22 of the leading shoes of the rear wheels 38. FIG. 2 illustrates hydraulic master cylinders 40 and 42 respectively operated by pneumatic motors 44 and 46 as being provided to pressurize the hydraulic systems 32 and 34 for brake actuation. It will be appreciated, however, that in place of the illustrated static hydraulic system, the pistons could alternatively be operated by full flow or dynamic hydraulic systems wherein the operating pressures are predetermined by preset control valves in turn arranged for operation responsive to depression of the braking pedal.

In addition to the advantage already mentioned, the hydraulic system provided by the invention ensures that, even when shoe expander units 10 provided with pistons of different cross-sectional areas are used, the volumetric requirements of both hydraulic circuits 32 and 34 are similar, since both have to supply fluid to small and large diameter cylinders in the expander unit.

I claim:

1. A vehicle braking system for a vehicle having front and rear wheels, comprising a shoe drum brake associated with each wheel, each shoe drum brake having a leading and trailing arcuate brakeshoe, a respective shoe lining being attached to each brakeshoe, a hydraulically actuated expander unit between one pair of adjacent ends of each shoe, a fixed anchorage arranged between the other pair of adjacent ends, said expander unit including oppositely directed shoe displacing pistons having different cross-sectional working areas slidably housed in separate cylinders within said expander unit, said pistons being constructed and arranged to move away from each other to apply the brakes in response to fluid pressure acting on their working areas, the piston having the larger cross-sectional working area being arranged to displace the trailing shoe and each cylinder being inclined to assist in positioning the center of pressure of the lining in the region of the center of area of said lining, said system further including a source of fluid pressure, first conduit means connecting the cylinders for the leading shoes at the vehicle front wheels with the cylinders for the trailing shoes at the vehicle rear wheels, second conduit means connecting the cylinders for the trailing shoes at the front wheels with the cylinders for the leading shoes at the rear wheels, means for applying fluid pressure from said source to said first conduit means to actuate the leading shoes at the front wheels with the trailing shoes at the rear wheels, and means independent of said first means for applying simultaneously with the said first means fluid pressure from said source to said second conduit means to actuate the trailing shoes at the front wheels with the leading shoes at the rear wheels.

2. A vehicle braking system according to claim 1, wherein said first and second fluid pressure applying means comprises a hydraulic master cylinder connected to each of said first and second fluid conduit means.